United States Patent [19]

Diamond

[11] Patent Number: 4,568,940
[45] Date of Patent: Feb. 4, 1986

[54] DUAL-MODE RADAR RECEIVER

[75] Inventor: Paul Diamond, Canoga Park, Calif.

[73] Assignee: Hughes Aircraft Company, El Segundo, Calif.

[21] Appl. No.: 333,363

[22] Filed: Dec. 22, 1981

[51] Int. Cl.[4] .............................................. G01S 13/44
[52] U.S. Cl. .................................................. 343/16 M
[58] Field of Search ............. 343/5 NQ, 16 M, 16 LS

[56] References Cited

U.S. PATENT DOCUMENTS

| 3,128,461 | 4/1964 | Case, Jr. | 343/16 M |
| 3,197,776 | 7/1965 | Winn | 343/16 M |
| 3,863,259 | 1/1975 | Boughnou et al. | 343/16 M X |

Primary Examiner—T. H. Tubbesing
Assistant Examiner—John B. Sotomayor
Attorney, Agent, or Firm—Charles D. Brown; Kenneth W. Float; A. W. Karambelas

[57] ABSTRACT

Apparatus is disclosed which processes sum and difference signals generated from received radar signals to provide target angle information in terms of amplitude or phase. The system includes an IF section and an RF section which processes the sum and difference signals. In the amplitude mode, the sum and difference signals are processed in a conventional manner through a hybrid combiner to an amplitude angle detector which provides the desired target information. A selectively controllable phase shifter is provided as part of the IF section to control the phase of the difference signals provided as output signals therefrom. In the amplitude mode, the phase delay associated with of the signals in the sum and difference channels is matched (zero phase difference between channels) so that amplitude information is processed to generate the target information. In the phase mode, the difference signals are incremented by 90° which generates signals indicative of target phase information. These output signals are processed by a phase angle detector to provide the desired target information.

6 Claims, 2 Drawing Figures

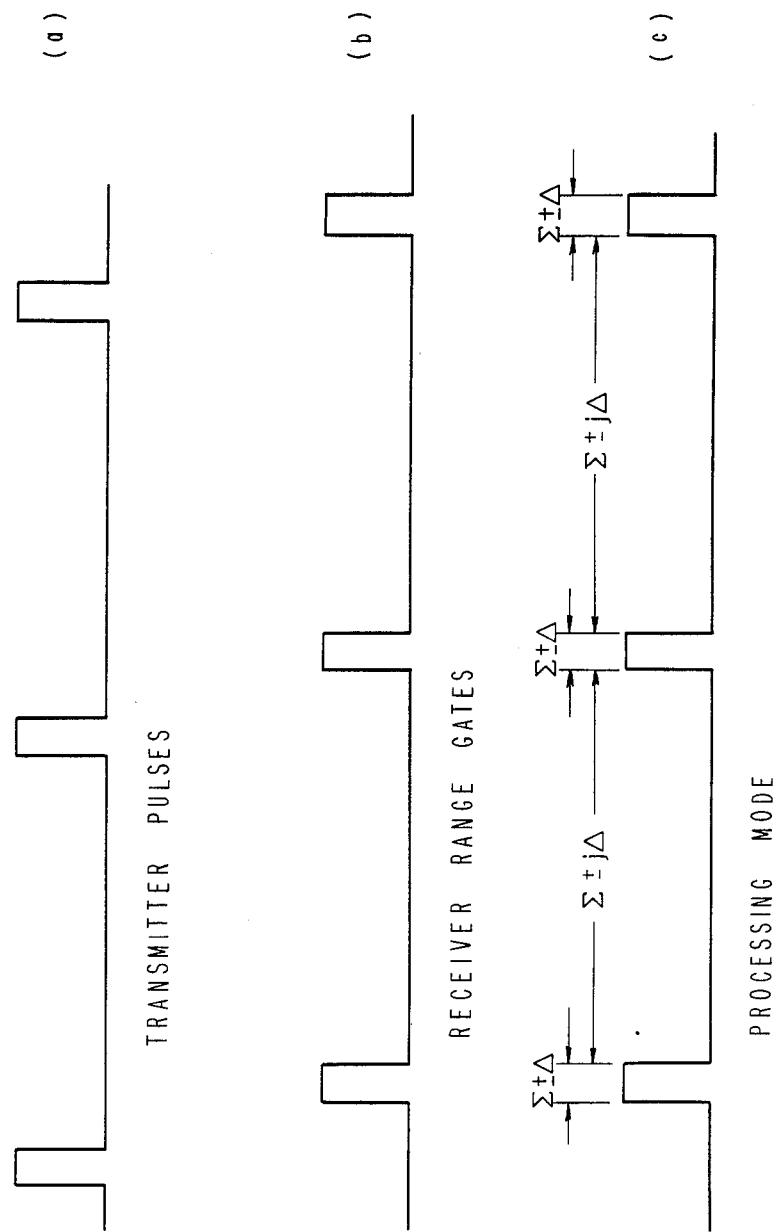

DUAL-MODE RADAR RECEIVER

BACKGROUND OF THE INVENTION

The present invention relates generally to radar receivers and more particularly to radar receivers which process target angle information in terms of amplitude or phase information.

Heretofore, radar receivers have been designed to either amplitude or phase encode the angle of the target with respect to the antenna boresight. In an amplitude sensitive system, sum and difference signals derived from a monopulse comparator are added in phase in the receiver to produce $\Sigma+\Delta$ and $\Sigma-\Delta$ signals. A major advantage of this approach is that the target angle is proportional to $\Delta/\Sigma$ which is easy to compute in a radar signal processor. A second advantage is that the two receiver channels ($\Sigma$ and $\Delta$) do not require close phase matching. A major disadvantage of the amplitude encoding system is its vulnerability to gain saturation. For signals large enough to saturate the receiver, the $\Sigma$ and $\Delta$ magnitude data is not valid and the angle information is lost.

The second type of radar receiver operates in a manner which phase encodes the target angle information. In this radar system, the receiver combines the $\Sigma$ and $\Delta$ signals in quadrature to produce the $\Sigma+j\Delta$ and $\Sigma-j\Delta$ signals. The target angle is proportional to $\phi(\Sigma+j\Delta)-\phi(\Sigma-j\Delta)$. This system tracks the target angle in the presence of large signals, but requires a complex signal processor to do so. In addition, phase matching between the two receiver channels is required.

Because of the differing advantages and disadvantages of the two detection schemes, it would be an improvement in the radar art to have a radar receiver which is capable of detecting target information in terms of both amplitude and phase information.

SUMMARY OF THE INVENTION

The present invention provides for a dual-mode radar receiver which selectively processes either amplitude or phase information received from a detected target. The radar receiver has first (sum) and second (difference) channels which receive sum and difference signals from a monopulse comparator, or the like, which derives signals from an antenna. The sum signals are applied to the first channel while the difference signals are applied to the second channel.

Each channel has an RF section and an IF section. The RF section of each channel is coupled to a local oscillator for receiving signals therefrom which are employed to convert the RF signals into IF signals. The IF section includes a 180° hybrid combiner which combines the sum and difference signals to provide output signals indicative of the addition of the sum and difference signals, and the difference of the sum and difference signals. These particular output signals are indicative of target angle information in terms of amplitude. These output signals are applied to an amplitude angle detector for processing to provide the desired target angle information.

The improvement provided by the present invention provides for an electronically controlled phase shifter disposed between the local oscillator and the RF section of the second channel. The phase shifter selectively controls the phase of the local oscillator signals provided to the second channel. The phase shifter selectively provides either an initial phase which matches the phase delay associated with the sum and difference channels (first mode), or increments the phase in the difference channel by 90° (second mode). When in the second mode, the output of the difference channel has a 90° phase shift associated therewith. Accordingly, the 180° hybrid combiner provides output signals which are indicative of target angle information in terms of their relative phase. A phase angle detector is coupled to the outputs of the hybrid combiner in order to process the phase angle information provided thereby in order to generate target angle information.

Thus, by selectively controlling the output of the phase shifter, the operational mode of the receiver may be changed from one of processing amplitude information to one of processing phase information. For example, the receiver may operate in the amplitude mode while performing conventional range gating of acquired targets. For intervals of time outside the range gates, the receiver may process the phase information of received targets, hence allowing the receiver to track targets which might otherwise jam the receiver operating only in the amplitude mode.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 illustrates a timing diagram associated with the receiver of FIG. 1.

DETAILED DESCRIPTION OF THE INVENTION

Figure 1:
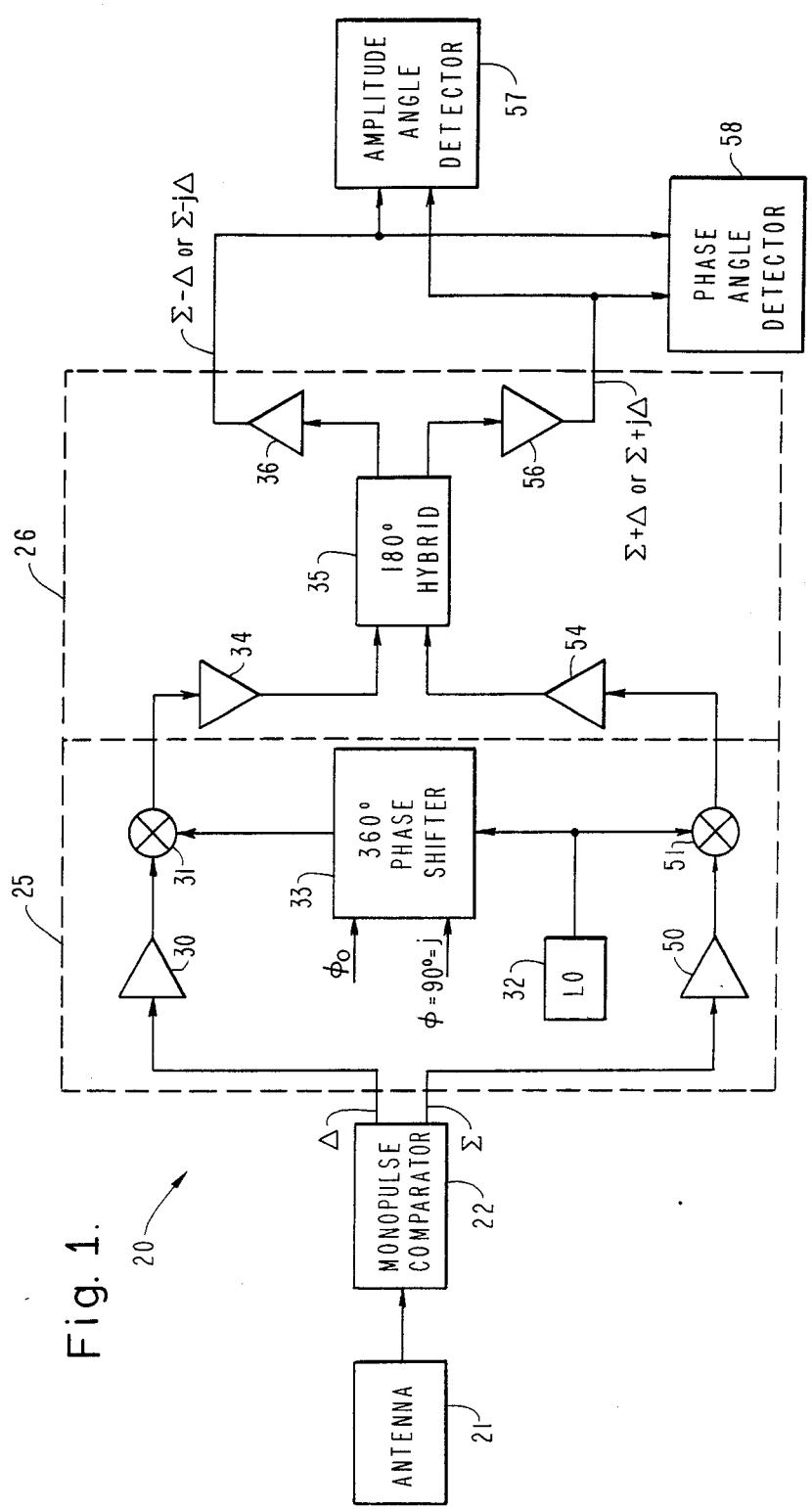
FIG. 1 illustrates a dual-mode radar receiver in accordance with the principles of the present invention.

Referring to FIG. 1, a dual-mode radar receiver in accordance with the present invention is shown. The receiver 20 is designed to process sum and difference signals received from a monopulse comparator 22. The monopulse comparator 22 generates sum and difference output signals based on target information received by an antenna 21 coupled thereto. The receiver 20 generally comprises first and second channels which process the sum and difference signals, respectively.

The receiver 20 comprises an RF section 25 and an IF section 26. Each of the first and second channels include portions of the RF and IF sections 25, 26. The first channel which processes the difference signals, also referred to as the difference channel, includes a preamplifier 30 and mixer 31. Similarly, the second channel which processes the sum signals, also referred to as the sum channel, includes a preamplifier 50 and mixer 51. A local oscillator 32 is coupled to the mixer 51 of the sum channel, and through an electronically controlled phase shifter 33 to the mixer 31 of the difference channel.

The phase shifter 33 may be programmed by means of a plurality of inputs which controls the phase of the output signals provided thereby. Typically, the initial phase provided by the phase shifter 33 matches the phase delay associated with the output signals provided by the sum and difference channels. Hence, the phase difference between channels is zero degrees. The second input is chosen to selectively apply a 90° phase shift to the local oscillator signals applied to the difference channel. Outputs of the mixers 31, 51 of the difference and sum channels are applied through postamplifiers 34, 54 to inputs of a 180° hybrid combiner 35. The hybrid combiner 35 combines the sum and difference signals to provide output signals which are the sum or difference of the two input signals received thereby. The outputs of the combiner 35 are applied through respective amplifiers 36, 56 to the inputs of an amplitude angle detector 57 and a phase angle detector 58.

The concept of matching the phase of the sum and difference channels is known in the art. For example, U.S. Pat. No. 3,883,870 for "System for Phase Aligning Parallel Signal Processing Channels", discloses a phase-matching system for use with monopulse radars. A variable phase shifter is utilized along with a test signal generator and phase detector to match and phase-lock the signals provided by the sum and difference channels of the radar receiver. The two channels are continuously maintained in a phase-matched condition irrespective of variations in temperature or operating frequency, or the like.

The components of the receiver of FIG. 1 are generally well-known in the radar art, but each particular receiver design commonly employs custom manufactured components. However, these components may be obtained from various manufacturers which have off-the-shelf units that may be used as is, or modified as necessary, to perform the desired functions. For example, manufacturers such as Microwave Associates, Burlington, Mass. produce monopulse comparators and phase shifters, while Watkins Johnson, Palo Alto, Calif. produces 180° hybrid combiners and other microwave products. The amplitude and phase angle detectors are generally custom made devices, although conventional detectors have been used in prior radar receivers. Digital processing may also be employed by the use of computer hardware and software to perform the target angle detection.

In operation, the receiver 20 receives sum and difference signals from the monopulse comparator 22. The difference signals are processed by the difference channel while the sum signals are processed by the sum channel. The sum and difference signals are in the form of RF signals which are down-converted by the RF section 25 into corresponding IF signals. This is done in a conventional manner by means of the local oscillator 32 and the mixers 31, 51. When in an amplitude mode, the phase shifter 33 injects phase information ($\phi_0$) into the local oscillator signals provided to the difference channel which match the phase delay (zero degrees phase difference) associated with the output signals provided by both the sum and difference channels. However, when operating in a phase mode, the phase shifter 33 introduces a 90° phase shift into the local oscillator signals provided to the difference channel. Accordingly, the output of the difference channel is incremented by the 90° phase shift.

The 180° hybrid combiner 35 is utilized to combine the signals ($\Sigma$ and $\Delta$) provided by the sum and difference channels, respectively, into output signals which are either the sum or the difference of the input signals. Accordingly, when the receiver 20 is operating in the amplitude mode, the output signals provided by the combiner 35 are $\Sigma - \Delta$ and $\Sigma + \Delta$. These two output signals are applied to the amplitude angle detector 57 which processes these signals to generate target angle information in terms of amplitude information. When operating in the phase mode, the combiner 35 provides output signals corresponding to $\Sigma - j\Delta$ and $\Sigma + j\Delta$, where $j = 90°$. These output signals are applied to the phase angle detector 58 which correspondingly processes the signals to provide the target angle information as a function of phase angle information.

The operation of the receiver 20 may be such that amplitude information is processed during the conventional range gating time while phase information is processed during time periods outside the range gating time. FIG. 2 shows a typical timing diagram which illustrates the timing sequence associated with the two modes of operation of the receiver 20.

Thus, there has been described a new and improved dual-mode radar receiver. This receiver is capable of operating in two modes which process target angle information in terms of amplitude or phase. This receiver combines the benefits of both amplitude and phase detection schemes while eliminating some deficiencies associated with both schemes.

It is to be understood that the above-described embodiment is merely illustrative of one of the many specific embodiments which represent applications of the principles of the present invention. Clearly, numerous and varied other arrangements may be readily devised by those skilled in the art without departing from the spirit and scope of the invention.

What is claimed is:

1. A dual-mode radar receiver which generates target angle information including sum and difference signals which is applied to first and second channels, and which combines the sum and difference signals to provide output signals indicative of the addition and difference thereof, said output signals being indicative of target angle information in terms of amplitude, said output signals being applied to an amplitude angle detector during receiver range gates for processing the output signals to provide target angle information, wherein the improvement comprises:

an electronically controlled phase shifter coupled to said second channel for selectively controlling the phase of signals provided thereto, said phase shifter incrementing the phase of said difference signals by a predetermined amount, to provide second output signals which comprise the addition and difference of said sum and incremented difference signals and which are indicative of target angle information in terms of phase; and a phase angle detector for processing said second output signals during time periods outside said receiver range gates to provide said target angle information;

whereby selectively controlling the output of said phase shifter controls the operational mode of said receiver, thus providing target angle information in terms of amplitude or phase information.

2. A dual-mode radar receiver which generates target angle information including sum and difference signals which is applied to first and second channels, and which combines the sum and difference signals to provide output signals indicative of the addition and difference thereof, said output signals being indicative of target angle information in terms of amplitude, said output signals being applied to an amplitude angle detector for processing the output signals to provide target angle information, wherein the improvement comprises:

an electronically controlled phase shifter coupled to said second channel for selectively controlling the phase of signals provided thereto, said phase shifter incrementing the phase of said difference signals by a predetermined amount to provide second output signals which comprise the addition and difference of said sum and incremented difference signals and which are indicative of target angle information in terms of phase; and a phase angle detector for processing said second output signals to provide said target angle information;

whereby selectively controlling the output of said phase shifter controls the operational mode of said receiver, thus providing target angle information in terms of amplitude or phase information.

3. A dual-mode radar receiver for selectively processing both amplitude or phase information, said receiver having first and second channels which generates target angle information including sum and difference signals which is applied to respective channels, said sum and difference signals being combined to provide output signals indicative of the addition and difference of the sum and difference signals, said output signals being indicative of target angle information in terms of amplitude, said output signals being applied to an amplitude angle detector for processing the output signals to provide target angle information, wherein the improvement comprises:

an electronically controlled phase shifter coupled to said second channel for selectively controlling the phase of signals provided thereby, said phase shifter incrementing the phase of said difference signals by a predetermined amount to provide second output signals which comprise the addition and difference of said sum and incremented difference signals and which are indicative of target angle information in terms of phase; and a phase angle detector for processing said second output signals to provide said target angle information;

whereby selectively controlling the output of said phase shifter controls the operational mode of said receiver, thus providing target angle information in terms of amplitude or phase information.

4. A dual-mode radar receiver for selectively processing both amplitude or phase information, said receiver having first and second channels which utilize target angle information including sum and difference signals applied to respective channels, each channel having an RF section and an IF section, each RF section being coupled to a local oscillator for receiving signals therefrom which convert the RF signals into IF signals, said IF section having a 180° hybrid combiner which combines the sum and difference signals to provide output signals indicative of the addition and difference of the sum and difference signals applied thereto, said output signals being indicative of target angle information in terms of amplitude, said output signals being applied to an amplitude angle detector for processing the output signals to provide target angle information, wherein the improvement comprises:

an electronically controlled phase shifter disposed between said local oscillator and the RF section of said second channel for selectively controlling the phase of local oscillator signals provided thereto, said phase shifter incrementing the phase of said difference signals by a predetermined amount, said hybrid combiner thus selectively providing second output signals which comprise the incremented difference signals and which are indicative of target angle information in terms of phase; and a phase angle detector for processing phase angle information provided by said hybrid combiner which comprises sum minus the incremented difference and sum plus the incremented difference signals to provide the target angle information;

whereby selectively controlling the output of said phase shifter controls the operational mode of said receiver, thus providing target angle information in terms of amplitude or phase information.

5. A radar receiver which generates target angle information including sum and difference signals which are applied to first and second channels respectively, and which combines the sum and difference signals to provide output signals indicative of the addition and difference thereof, said output signals being indicative of target angle information in terms of amplitude, said output signals being applied to an amplitude angle detector for processing the output signals to provide target angle information, said radar receiver further comprising:

first means coupled to said second channel for selectively controlling the phase of signals provided thereto, and for incrementing the phase of said difference signals by a predetermined amount;

second means for providing second output signals which comprise the addition and difference of said sum and incremented difference signals and which are indicative of target angle information in terms of phase; and a phase angle detector for processing said second output signals to provide said target angle information;

whereby selectively controlling the output of said first menas controls the operational mode of said receiver, thus providing target angle information in terms of amplitude or phase information.

6. The radar receiver of claim 5 wherein:

said first means comprises an electronically controlled phase shifter; and said second means comprises a hybird combiner.

* * * * *